US007567798B2

(12) United States Patent
Brunel et al.

(10) Patent No.: US 7,567,798 B2
(45) Date of Patent: Jul. 28, 2009

(54) SYSTEM FOR ACCESSING MULTIMEDIA FILES FROM A MOBILE TERMINAL

(75) Inventors: Jerome Brunel, Combray (FR);
Jean-Luc Grimault, Mondeville (FR);
Olivier Magnon, Ifs (FR)

(73) Assignee: France Telecom, Paris (FR)

( * ) Notice: Subject to any disclaimer, the term of this patent is extended or adjusted under 35 U.S.C. 154(b) by 399 days.

(21) Appl. No.: 10/571,269

(22) PCT Filed: Sep. 8, 2004

(86) PCT No.: PCT/FR2004/002274

§ 371 (c)(1),
(2), (4) Date: Mar. 9, 2006

(87) PCT Pub. No.: WO2005/027461

PCT Pub. Date: Mar. 24, 2005

(65) Prior Publication Data

US 2007/0026849 A1 Feb. 1, 2007

(30) Foreign Application Priority Data

Sep. 11, 2003 (FR) .................................. 03 10716

(51) Int. Cl.
*H04M 3/00* (2006.01)
(52) U.S. Cl. ................. 455/414.1; 455/418; 455/422.1; 707/3; 707/10; 709/204; 709/229; 709/231; 713/176
(58) Field of Classification Search ............... 455/414.1, 455/418, 422.1; 707/3, 10; 709/204, 229, 709/231; 713/176, 200
See application file for complete search history.

(56) References Cited

U.S. PATENT DOCUMENTS

| 6,275,848 | B1 | 8/2001 | Arnold |
| 2002/0073205 | A1 | 6/2002 | Mostafa |
| 2002/0116465 | A1 | 8/2002 | Kim et al. |

(Continued)

FOREIGN PATENT DOCUMENTS

EP         1286515         2/2003

(Continued)

OTHER PUBLICATIONS

PCT/FR2004/002274 International Search Report mailed Jan. 19, 2005.

*Primary Examiner*—William D Cumming
(74) *Attorney, Agent, or Firm*—Lowe Hauptman Ham & Berner LLP

(57) ABSTRACT

The system enables a user of mobile terminal (T1) to store and access to numerous multimedia files with no limit on size relative to the capacities of his mobile terminal. A sorting centre or a web server (CTM, SW) detects a multimedia file (FM) in a message (MT2) transmitted by a second terminal (T2) in order to extract therefrom an address (AT1) of the mobile terminal, a text block (BT) and a detected multimedia file (FM). A storing space (SSM) stores the extracted multimedia file in corresponding relationship with the extracted address (AT1). The sorting centre or a web server establishes a notification command (CN) including the address (AT1) and the text block (BT). A notification server (SN) transmits a storage notification (NSFM) including the text file (BT) to the terminal (T1).

18 Claims, 4 Drawing Sheets

U.S. PATENT DOCUMENTS

| | | | |
|---|---|---|---|
| 2003/0033254 A1 | 2/2003 | Tanaka | |
| 2004/0260701 A1* | 12/2004 | Lehikoinen et al. | 707/10 |
| 2005/0015443 A1* | 1/2005 | Levine et al. | 709/204 |
| 2005/0020250 A1* | 1/2005 | Chaddha et al. | 455/414.1 |
| 2005/0039040 A1* | 2/2005 | Ransom et al. | 713/200 |
| 2006/0047844 A1* | 3/2006 | Deng | 709/231 |
| 2006/0264209 A1* | 11/2006 | Atkinson et al. | 455/422.1 |
| 2006/0271696 A1* | 11/2006 | Chen et al. | 709/229 |
| 2007/0026849 A1* | 2/2007 | Brunel et al. | 455/418 |
| 2007/0027857 A1* | 2/2007 | Deng et al. | 707/3 |
| 2007/0207782 A1* | 9/2007 | Tran | 455/414.1 |
| 2008/0016365 A1* | 1/2008 | Moskowitz | 713/176 |

FOREIGN PATENT DOCUMENTS

| | | |
|---|---|---|
| WO | 0113656 | 2/2001 |
| WO | 03036888 | 5/2003 |

\* cited by examiner

SYSTEM FOR ACCESSING MULTIMEDIA FILES FROM A MOBILE TERMINAL

REFERENCE TO RELATED APPLICATION

This application is a continuation of the PCT International Application No. PCT/FR04/02274 filed Sep. 08, 2004, which is based on the French Application No. 0310716 filed Sep. 11, 2003.

BACKGROUND OF THE INVENTION

1. Field of the Invention

The present invention relates to a system and a method for access to multimedia files from a first mobile radiotelephone terminal when the multimedia files have been sent to the latter by another terminal. The multimedia file may be sent in the form of an electronic mail (e-mail) message or by a multimedia messaging service (MMS) application or by a web client-server type application.

2. Description of the Prior Art

The addressee of the multimedia file using the first mobile terminal accesses the multimedia file either using a personal computer connected to the Internet network to read it in his electronic mail system or directly from his mobile terminal in the case of an MMS message. When the multimedia file is transmitted by an MMS message, that is to say in the form of a "multimedia short message", the multimedia file is not stored in the telecommunication network but memorized directly in the mobile terminal after transmission via the GSM or GSM/GPRS type mobile radiotelephone network serving the mobile terminal.

The larger the size of the multimedia file, the more lengthy and costly is the transmission of a multimedia file over the radiotelephone access network of the mobile terminal. Furthermore, storage capacities in mobile terminals being generally limited, the user of the mobile terminal is obliged to delete the multimedia files as and when the mobile terminal has received them. If a multimedia file is transmitted by electronic mail, the user of the mobile terminal must have a personal computer available and configure it correctly to receive electronic mail with multimedia files transmitted by other users.

OBJECT OF THE INVENTION

An object of the present invention is to enable a mobile terminal user to store and to access numerous multimedia files with no limit on size relative to the storage capacities of his mobile terminal in order to be permanently able to consult, or even recover, multimedia files transmitted by other users.

SUMMARY OF THE INVENTION

To achieve this object, a system for access to multimedia files through a telecommunication network from a mobile radiotelephone terminal for which are intended messages, each message including an address of the mobile terminal and a multimedia file transmitted by second terminals, the system including a server for detecting a multimedia file in a message transmitted by the second terminal in order to extract therefrom the address of the mobile terminal and the detected multimedia file, to store the multimedia file extracted from the message in storage means, and notification means for transmitting a multimedia file storage notification to the mobile terminal identified by the address extracted from the message, is characterized in that the storage means is a storage space that is assigned to the user of the mobile terminal and is accessible to the mobile terminal through the server in order for the multimedia file extracted from the message to be stored therein in corresponding relationship with the address of the mobile terminal extracted from the message, and in that the mobile terminal accesses the stored multimedia file only if the server has recognized the address of the mobile terminal supplied after the setting up of a connection between the mobile terminal and the server.

Access to the file may consist interchangeably in downloading or continuous display in accordance with a technique known to the person skilled in the art as "streaming" enabling a file to be accessed before it finishes downloading. The example serving to illustrate the invention will be file downloading.

The server advantageously comprises
command means for establishing a notification command including the address of the mobile terminal and a text block, both extracted from the message, and
and notification means for transmitting the multimedia file storage notification including the text block to the mobile terminal identified by the address included in the notification command transmitted by the command means.

The detection means and the command means may be in a message sorting center connected to an access network to which the second terminal is connected directly, or in a web server accessible to the second terminals through a high bit rate packet network via an access network.

Instead of transmitting the multimedia file directly to the mobile terminal using the previous technique, the access system of the invention intercepts the multimedia file and stores it in storage means assigned to the user of the mobile terminal, and then notifies that storage to the user of the mobile terminal so that the latter can proceed to download the multimedia file that is stored when he wishes. The storage means may be a storage area in a server dedicated to storing multimedia files and accessible to the mobile terminal through a web server. The multimedia file is transmitted from the storage means to the mobile terminal either through the radiotelephone network to which the mobile terminal belongs or through a station connected to the Internet network and having a short-range connection with the mobile terminal.

The system of the invention frees the memory of the mobile terminal from memorizing excessively large multimedia files or multimedia files that have already been read and gives access to the storage means through a high bit rate connection that may be connected to the short-range connection station for the mobile terminal.

The invention concerns also a method for access to multimedia files through a telecommunication network from a mobile radiotelephone terminal for which are intended messages, each message including an address of the mobile terminal and a multimedia file transmitted by second terminals, the method including through the telecommunication network the steps of:
detecting a multimedia file in a message transmitted by the second terminal in order to extract therefrom the address of the mobile terminal and the detected multimedia file,
storing the multimedia file extracted from the message, and
notifying multimedia file storage by a notification including the identity of the second terminal transmitted to the mobile terminal identified by the address included in the notification command,
the method being characterized in that the by an assignment of a storage space accessible to the mobile terminal through the telecommunication network in order for the multimedia file extracted from the message to be stored therein in corresponding relationship with the address of the mobile terminal extracted from the message, and the mobile terminal accesses the stored multimedia file only if the address of the mobile terminal supplied after the setting up of a connection between the mobile terminal and the server is recognized.

The method may comprise downloading in the mobile terminal or from the mobile terminal of a multimedia file that is stored in corresponding relationship to the extracted address in storage means assigned to the mobile terminal, via a server through a radiotelephone network to which the mobile terminal belongs if the mobile terminal is not detected by a station having a short-range connection with the mobile terminal, and through the station if the mobile terminal is detected by the station.

Another object of the invention is also to provide the storage server characterized in that said storage means is a storage space that is assigned to the user of the mobile terminal and that is accessible to the mobile terminal through the server in order for the multimedia file extracted from the message to be stored therein in corresponding relationship with the address of the mobile terminal extracted from the message, the mobile terminal accessing the stored multimedia file only if the server has recognized the address of the mobile terminal supplied after the setting up of a connection between the mobile terminal and the server.

Finally, the invention relates to a computer program adapted to be implemented in a storage server, said program including program instructions, which, when the program is executed in said server, carry out the following steps:

detecting a multimedia file in a message transmitted by the second terminal in order to extract therefrom the address of the mobile terminal and the detected multimedia file,
  storing the multimedia file extracted from the message,
  notifying multimedia file storage by a notification including the identity of the second terminal and transmitted to the mobile terminal identified by the address, and
  access the stored multimedia file only if the web server has recognized the address of the mobile terminal supplied after the setting up of a connection between the mobile terminal and the web server.

BRIEF DESCRIPTION OF THE DRAWINGS

Other features and advantages of the invention will be apparent more clearly from the reading of the following description of several preferred embodiments of the invention, given by way of nonlimiting examples and with reference to the corresponding accompanying drawings in which.

DETAILED DESCRIPTION OF THE DRAWINGS

Figure 1:
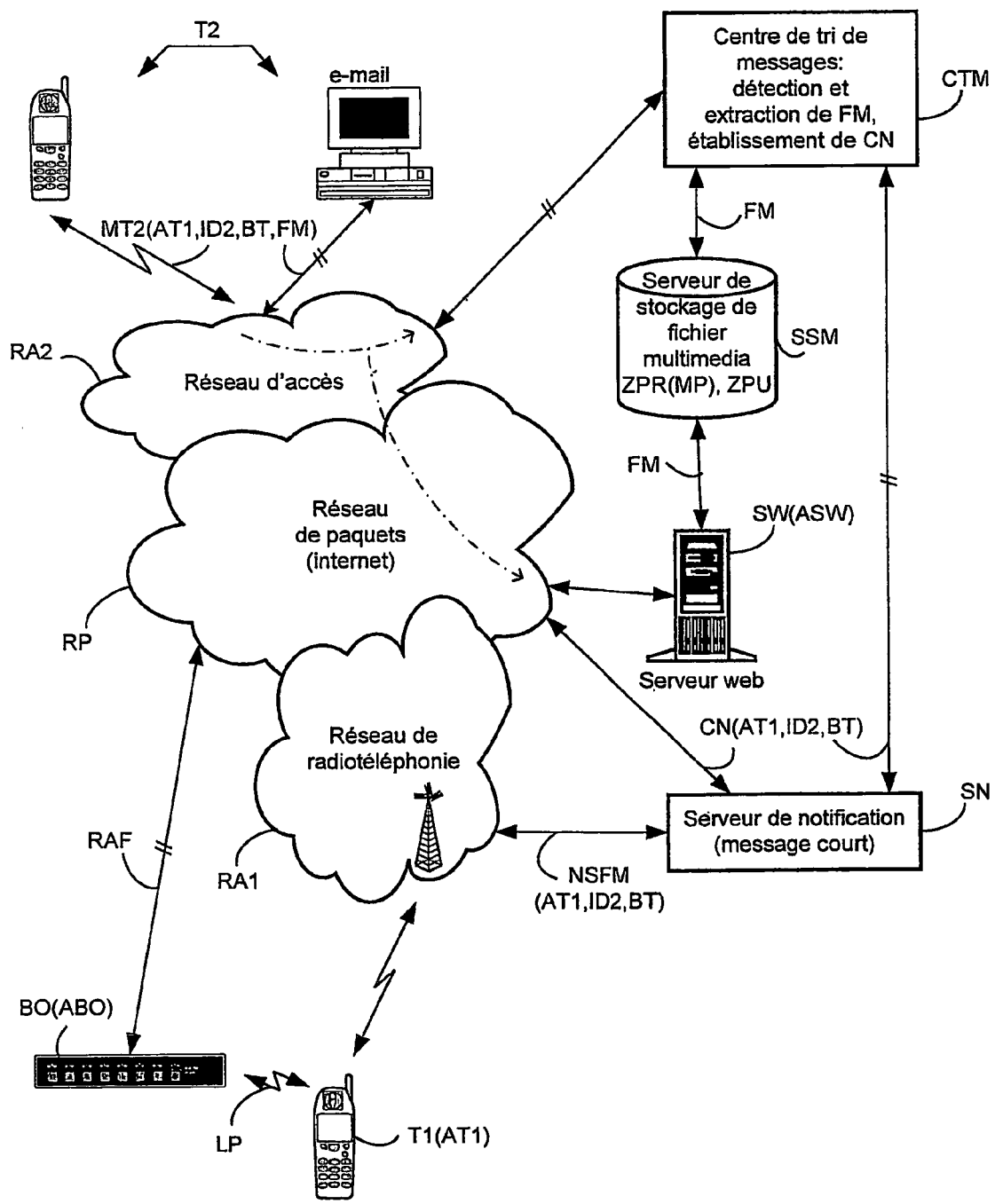
FIG. 1 is a block diagram of a multimedia file access system of the invention.

FIG. 1 shows essential means of a system of the invention for accessing multimedia files between a first mobile radiotelephone terminal T1 of a user who is the addressee of multimedia files and a second terminal T2 of a second user who may be any sender of multimedia messages. Nevertheless, the essential means shown in FIG. 1 are used so that a plurality of second users transmit from second terminals multimedia documents respectively intended for a plurality of first users each of whom has at least one first mobile radiotelephone terminal.

The essential means of the access system are connected mainly through a general telecommunication network generally including three telecommunication networks RA1, RP and RA2.

The network RA1 is a digital cellular radiotelephone network to which the first mobile terminal T1 belongs. For example, the radiotelephone network RA1 is a GSM, GSM/GPRS or UMTS network. The mobile terminal T1 is designated by an address AT1 consisting of the telephone number of the mobile terminal T1 called the mobile user international identification number MSISDN (Mobile Station ISDN Number).

In a complementary variant to which reference will be made in the remainder of the description, the mobile terminal T1 is able to communicate with another access network RAF through a station BO and a short-range connection LP. The station BO constitutes a fixed terminal of the user possessing the first mobile terminal T1 and is installed in that user's premises. The short-range connection LP between the station BO and the mobile terminal T1 may be a Bluetooth type radio connection or a radio connection conforming to the 802.11b (WiFi) standard or the Digital Enhanced Cordless Telecommunications (DECT) standard, or an infrared link. In practice, the station BO is able to serve via radio or cable short-range connections other terminals such as a personal computer, a television and a radio receiver or high fidelity system. The station BO and the terminals that are connected to it, in particular the mobile user terminal T1, constitute a fixed terminal that is connected to the access network RAF.

The network RAF may be the switched telephone network or an asymmetric digital subscriber line (ADSL) type telephone subscriber line that is connected in particular to the second telecommunication network of the system constituting a high bit rate packet network RP such as the Internet.

Alternatively, the station BO is connected directly to a personal computer of the user in the form of an integrated card or a modem or a USB module, for example.

The station BO monitors continually and at regular intervals the presence of mobile terminals such as the terminal T1 in its short radio range. If the station BO detects the mobile terminal T1, the station BO is able to trigger actions automatically, such as downloading a multimedia file addressed to the user of the terminal T1.

The third telecommunication network is an access network RA2 connected to the second terminal T2. When the second terminal T2 of the user sending the multimedia file is a mobile radiotelephone terminal, the access network RA2 is the GSM, GSM/GPRS or UMTS type digital cellular radiotelephone network to which the terminal T2 is connected. In another variant, the access network RA2 is the switched telephone network or comprises an ADSL type subscriber line. The terminal T2 may be a fixed telephone terminal connected to a fixed telephone line, for example a personal computer on which has been installed an electronic mail (e-mail) application or an application for depositing messages via a client-server interface.

In the example shown, the means constituting the multimedia file access system of the invention are three in number: multimedia file detecting and notification command establishing means consisting of a message sorting center CTM or a web server SW, multimedia file storage means consisting of a server SSM dedicated to storing multimedia files, and a notification server SN.

The sorting center CTM and the web server SW have equivalent roles in the detection and switching of multimedia files. One or both of them may therefore be provided in the access system of the invention.

The sorting center CTM is a server connected directly to the access network RA2 of the second terminal T2, for example through a mobile service switching center of the radiotelephone network serving the terminal T2 if the latter is a mobile radiotelephone terminal, or through a local office of the public switched telephone network PSTN if the terminal T2 is a fixed telephone terminal, or through a high bit rate packet network such as the Internet if the terminal T2 is a personal computer type terminal capable of transmitting electronic mail (e-mail). The sorting center CTM intercepts all the messages of the multimedia messaging service (MMS) multimedia message type transmitted by the terminal T2 (mobile radiotelephone terminal) or of the electronic mail (e-mail) type transmitted by the terminal T2 (personal computer), for example.

Hereinafter, a message of the MMS or e-mail type including a multimedia file FM transmitted by the second terminal T2 is designated MT2 regardless of the terminal type.

The sorting center CTM addressable in this way by any type of second terminal T2 includes detection means for detecting the possible presence of a multimedia file FM in a message MT2 transmitted from the terminal T2 to the terminal T1 and which has a size expressed in bytes that is greater than a minimum size fixed by the operator of the access network RA1 or by the user of the terminal T1 himself. The multimedia file in a message MT2 may be an attachment to the body of the message or included in the body of the message. The sorting center CTM also includes means for establishing notification commands CN, where appropriate including a text data block BT.

The web server SW has a role equivalent to the sorting center CTM, or more generally to the sorting centers associated with the various access networks of the second terminals, since the web server SW is accessible to any type of second terminal, fixed or mobile, through the Internet RP. The server SW is equally useful to the user of the first terminal T1 for accessing, from any terminal connected to the Internet, including the mobile terminal T1, a storage space assigned to the user in the server SSM that has stored multimedia files sent to him and for consulting, deleting or adding multimedia files in the assigned storage space from any terminal connected to the Internet, including the mobile terminal T1. Direct depositing of multimedia files in the web server SW using the browsing functions thereof is similar to any deposition of messages to be notified to the terminal T1.

The multimedia file storage server SSM may be of the database management server type dedicated to storing multimedia files and connected to the sorting center CTM and to the server SW by dedicated connections. According to another variant, the server SSM is implemented in the sorting center CTM or the web server SW.

The storage space assigned to the user of the terminal T1 is configured through the server SW, in particular in terms of size and directory. That storage space is identified by means of a universal resource locator (URL) address relayed by the server SW or the sorting center CTM. The assigned storage space accessible from the terminal T1 in particular through the access network RA1 or through the station BO and the access network RAF may be divided into a private zone ZPR and a public zone ZPU. The private zone ZPR stores multimedia files of the user of the terminal T1 inaccessible to other users. The public zone ZPU stores multimedia files, in particular transmitted from the terminal T2, accessible to any other user, preferably subject to validation of a predetermined password MP transmitted by the second terminal T2 and communicated beforehand by the user of the terminal T1 to other users.

The storage space, and in particular the public zone ZPU thereof, may comprise a dedicated album type directory in which are stored multimedia files such as photos with the JPEG format or conforming to other standards, video clips or musical pieces conforming to the MP3 standard or other standards, transmitted by second terminals after validation of the password. Access to this album, and generally to the public zone ZPU, may be protected in read and/or write mode by one or more passwords. An authorized user accesses the storage zone ZPU using the browser functions of the web server SW.

The notification server SN is connected to the sorting center CTM and to the web server SW over dedicated connections through the Internet RP or through an intranet. The notification server SN is installed in a short message server connected to a plurality of mobile service switching centers of the radiotelephone network RA1 serving the first terminal T1 through a gateway network for example such as an integrated services digital network (ISDN), an X.25 type packet transmission network or a Signaling System 7 (SS7) type connection. The multimedia file storage notifications NSFM established by the server SN are thus encapsulated in short messages (SM) transmitted by the short message server SC to the terminal T1 through the network RA1. Each notification includes an identifier ID2 of the user sending a multimedia file, such as the name of the sending user or at least the address of a terminal of that sending user, together with the name and the type of the multimedia file that has been stored and where appropriate a text block BT.

A multimedia file FM of the invention may be static and/or dynamic. A static multimedia file contains text and/or a graphic and/or a table and/or an image. A dynamic multimedia file contains sound, for example in the form of a musical piece or a voice sequence conforming to the MP3 standard or any other standard, a video sequence, and thus may comprise fixed and/or animated contents. The multimedia file may correspond to a multimedia document conforming to the MPEG-7 standard or any other standard, from which may be extracted text characteristics of the document relating to the title, to the publication date, to the author, to the producer of the document, which can then be recovered by the sorting center CTM or the server SW in order to introduce them by way of multimedia document description into a notification command CN and then into a notification NSFM.

Three methods of implementing the multimedia file access system of the invention are described hereinafter by way of example.

A first method relates to the transmission of a multimedia file FM from a second terminal T2 to the storage server SSM and notification of the storage of the multimedia file FM to the first terminal T1. It comprises steps 10 to 17 shown in FIG. 2.

It is assumed that the user of the terminal T1 has reserved beforehand a storage zone ZPU in the server SSM and has imposed a minimum size TM of the multimedia files to be stored, either directly or through the intermediary of the operator of the network RA1. The minimum size TM is a priori larger than the size of memory available in the mobile terminal T1 for storing a short text message with large size.

In a first variant of the first method, the multimedia file FM to be transmitted is switched by the sorting center CTM.

The user of the terminal T2 transmits a message MT2 containing the multimedia file FM from the terminal T2 in the step 10. The message MT2 is in the form of an MMS message if the terminal T2 is a radiotelephone terminal or in the form of an e-mail message if the terminal T2 is a personal computer, for example. To be more precise, the transmitted message MT2 contains, in addition to the multimedia file FM, including the name and the type of the file FM, the address AT1, i.e. the telephone number, of the destination terminal T1, an identifier ID2 of the sending terminal T2, such as the name of the user of the terminal T2 or the address and/or the telephone number of the terminal T2, and a text block BT describing characteristics of the multimedia file FM and/or the reason for transmitting the file FM, for example. The message MT2 is routed conventionally through the access network RA2 to the sorting center CTM in the step 10.

The sorting center CTM analyzes the received message MT2 only if a multimedia file is detected therein in the step 11. The sorting center extracts from the message MT2 firstly the data relating to the terminal address AT1, the user identifier ID2 and the text block BT and secondly the multimedia file FM.

In the next step 12, the sorting center CTM evaluates the size of the multimedia file FM detected in the message MT2 and compares it to the minimum size TM. If the multimedia file has a size smaller than the minimum size MT, the sorting center CTM establishes a notification command CN including all the data from the message MT2, including the small multimedia file, to the notification server SN, as indicated in the step 13.

Figure 2:
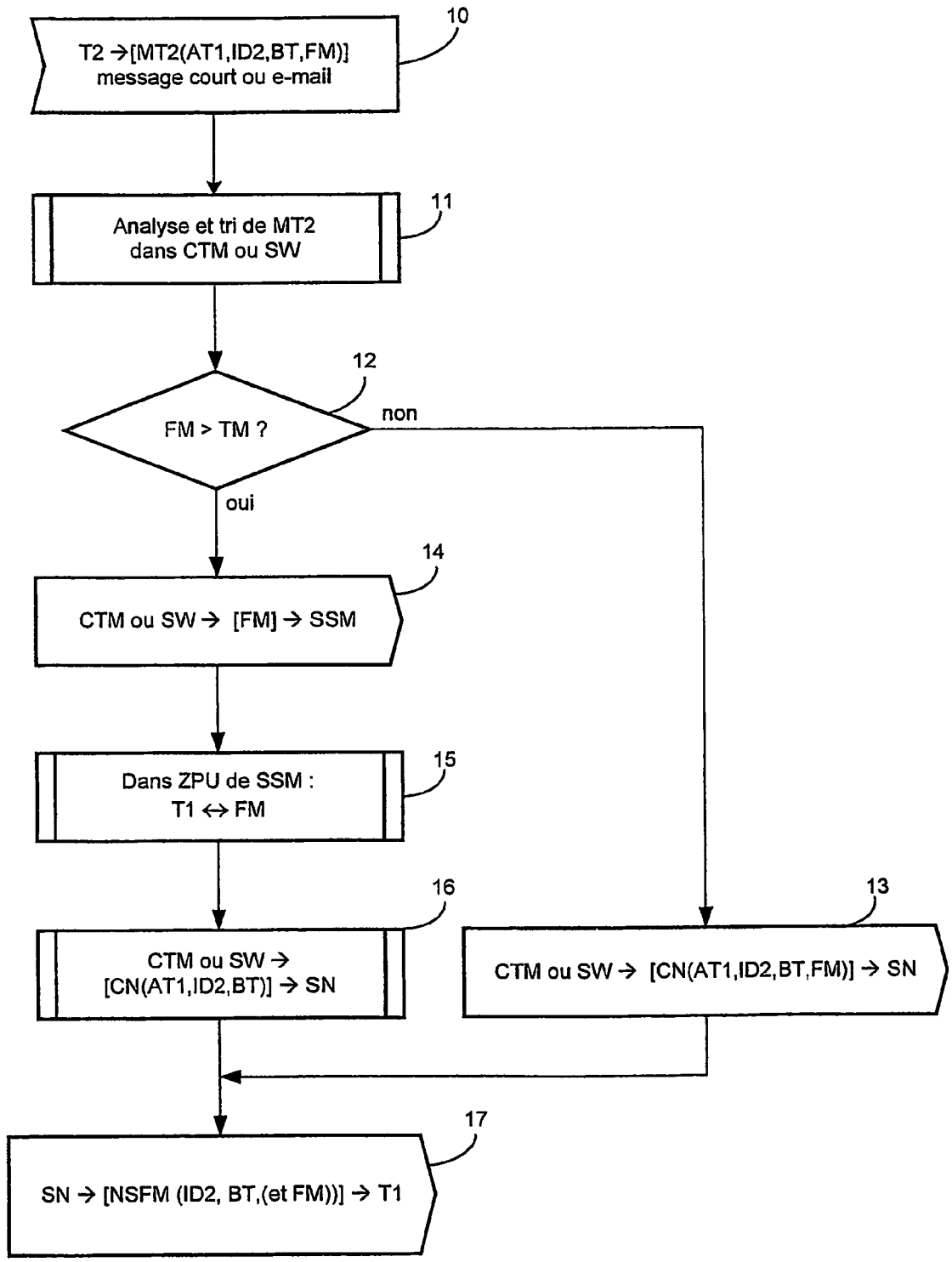
FIG. 2 is an algorithm of a multimedia file transmission method of the invention.

If the evaluated size of the multimedia file FM is greater than the minimum size TM in the step 12 the sorting center CTM switches the extracted multimedia file FM to the public zone ZPU in the storage server SSM for the latter to store the multimedia file in corresponding relationship to the extracted address AT1 of the destination terminal T1, as indicated in the steps 14 and 15 in FIG. 2.

In the example, the sorting center CTM sets up a notification command CN in parallel with the switching of the extracted multimedia file FM to the server SSM. The notification command CN includes all the data AT1, ID2 and BT contained in the received message MT2 except the multimedia file FM. The notification command CN established in this way is transmitted by the sorting center CTM to the notification server SN in the step 16. The notification server SN, which is a short message server, extracts the address AT1 of the terminal T1 from the received notification command CN in order to transmit it, by way of a destination address identifying the terminal T1, to the home location register (HLR) of the radiotelephone network RA1. The home location register reads the temporary mobile station identity (TMSI) assigned to the mobile terminal T1 and the address of the mobile service switching center to which the terminal T1 is temporarily connected.

After the step 13 or 16, the server SN encapsulates the identity TMSI transmitted by the home location register HLR and the data ID2 and BT, and where appropriate a small file FM, included in the received notification command CN in a short message serving as a multimedia file storage notification NSFM in the step 17. Reception of the short message NSFM therefore notifies the user of the terminal T1 that the attachment to the message MT2 consisting of the multimedia file FM has been sent to him by another user and, if the steps 14 to 16 have been effected, has been stored in his public storage zone ZPU in the server SSM. The user consults and recovers the multimedia file FM subsequently, as will be explained with reference to FIG. 3.

The first method for accessing a multimedia file as described above with reference to FIG. 2 is also applicable in a second variant by replacing the message sorting center CTM with the web server SW. The public storage zone ZPU assigned to the user of the terminal T1 in the server SSM is then accessible through the Internet RP after the user of the terminal T2 has been sent the address ASW of the server SW and the password MP for accessing the zone ZPU. In the step 10, the user of the terminal T2 wishing to deposit a multimedia file FM in the server SSM calls the server SW by entering the address ASW and then the password MP following an invitation message from the server SW. After validation by the server SW of the password MP transmitted by the terminal T2 in order to authorize deposition of the message MT2, the terminal T2 transmits the message MT2 (AT1, ID2, BT, FM) to the server SW.

As in steps 11 to 15, the server SW analyzes the message MT2 and orients the extracted multimedia file FM to store it in the public zone ZPU of the server SSM if the size of the multimedia file FM exceeds the minimum size TM. If the multimedia file has a size smaller than the minimum size TM, the server SSM establishes a notification command CN including all the data of the message MT2, including the small multimedia file, to the notification server SN, as indicated in the step 13. The server SW then informs the notification server SN by means of a notification command CN that the user of the terminal T2 has transmitted a multimedia file FM in the form of attachments, in a manner analogous to step 16. Then, in the step 17, the notification server SN sends a multimedia file storage notification NSFM in the form of a short message to the terminal T1 to indicate to the user thereof that the multimedia file FM has been deposited by the user of the terminal T2 in his storage zone ZPU in the server SSM.

In one particular embodiment, the dialog between the terminal T2 and the server SW is more user friendly in accordance with a client-server concept, the terminal T2 being a mobile or fixed terminal of the client type and the web server SW playing the server role. The interface offered to the user of the terminal T2 is "light" in this embodiment, for example of the Windows (Registered Trade Mark) type. In this embodiment, the user of the terminal T2 deposits a multimedia file FM in the public storage zone ZPU by:

selecting a "deposit multimedia file" menu,
entering the address AT1, i.e. the telephone number of the terminal T1, or selecting it in a directory of the terminal T2, and
entering his identity and the password MP if it is requested by an applet type small application implemented in the terminal T2.

The application then automatically converts the address AT1 into the Internet (IP) address or URL address ASW of the web server SW and then transfers the extracted multimedia file FM from the zone ZPU to the zone ZPR.

In another variant, the multimedia file storage server SSM is replaced by a memory space in a fixed terminal, such as the station BO, linked to the user possessing the mobile terminal T1. The sorting center CTM or the web server SW then transmits the extracted multimedia file FM to the fixed terminal to store it there in the step 15. The user consults or recovers the multimedia file FM stored locally.

Figure 3:
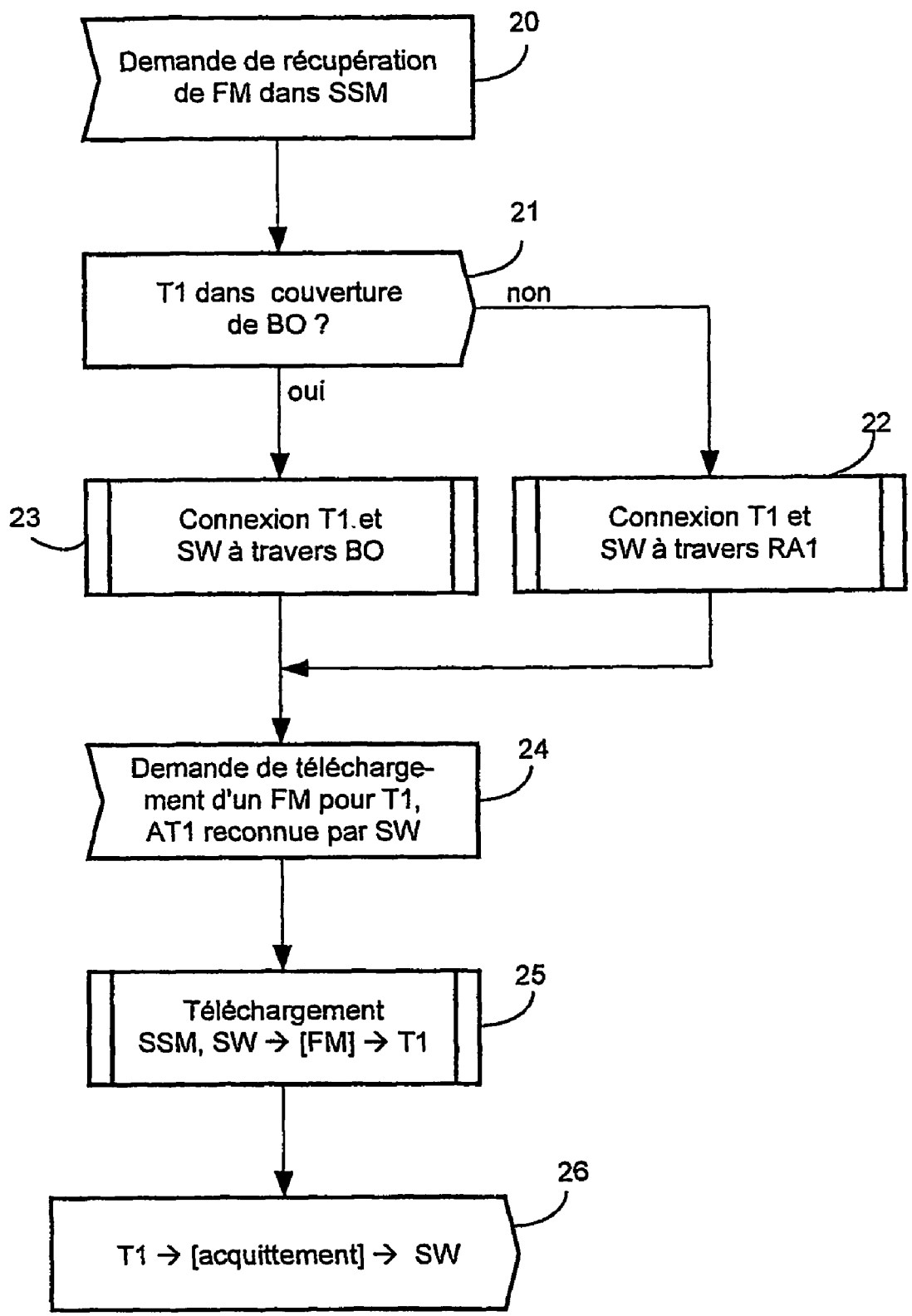
FIG. 3 is a multimedia file recovery method algorithm of the invention.

Recovering a multimedia file FM in the storage zone ZPU or ZPR assigned to the user of the terminal T1 in the server SSM comprises steps 20 to 26 shown in FIG. 3.

To access the storage zone ZPU or ZPR, in the step 20, the user selects a specific menu in the terminal T1 or presses a predetermined key on his terminal T1, which may in one embodiment be limited to switching on the terminal T1.

The terminal T1 verifies in the next step 21 if it is in the coverage area of the station BO. If the terminal T1 and the station BO do not detect each other, the terminal T1 decides to set up a connection with the web server SW through the radiotelephone network RA1 in the step 22, after validation of the user. Otherwise, in the step 23 the station BO that has detected the terminal T1 in its coverage area sets up a connection with the web server SW directly through the access network RAF, such as an ADSL.

After setting up the connection between the terminal T1 and the server SW in the step 22 or 23, a request to download a multimedia file FM contained in the storage zone ZPU or ZPR through the web server SW is authorized, in the step 24, only if the server SW has recognized the address AT1 of the terminal T1 supplied by the network RA1 or RP. A dialog is then initiated between the server SSM and the terminal T1 through the network RA1 or the station BO and the network RAF and the server SW in order for the user to command the downloading into the terminal T1 of one or more multimedia files FM in the step 25. After downloading each multimedia file, in the step 26, the terminal T1 acknowledges the storage of the multimedia file in the terminal T1 to the server SW.

Figure 4:
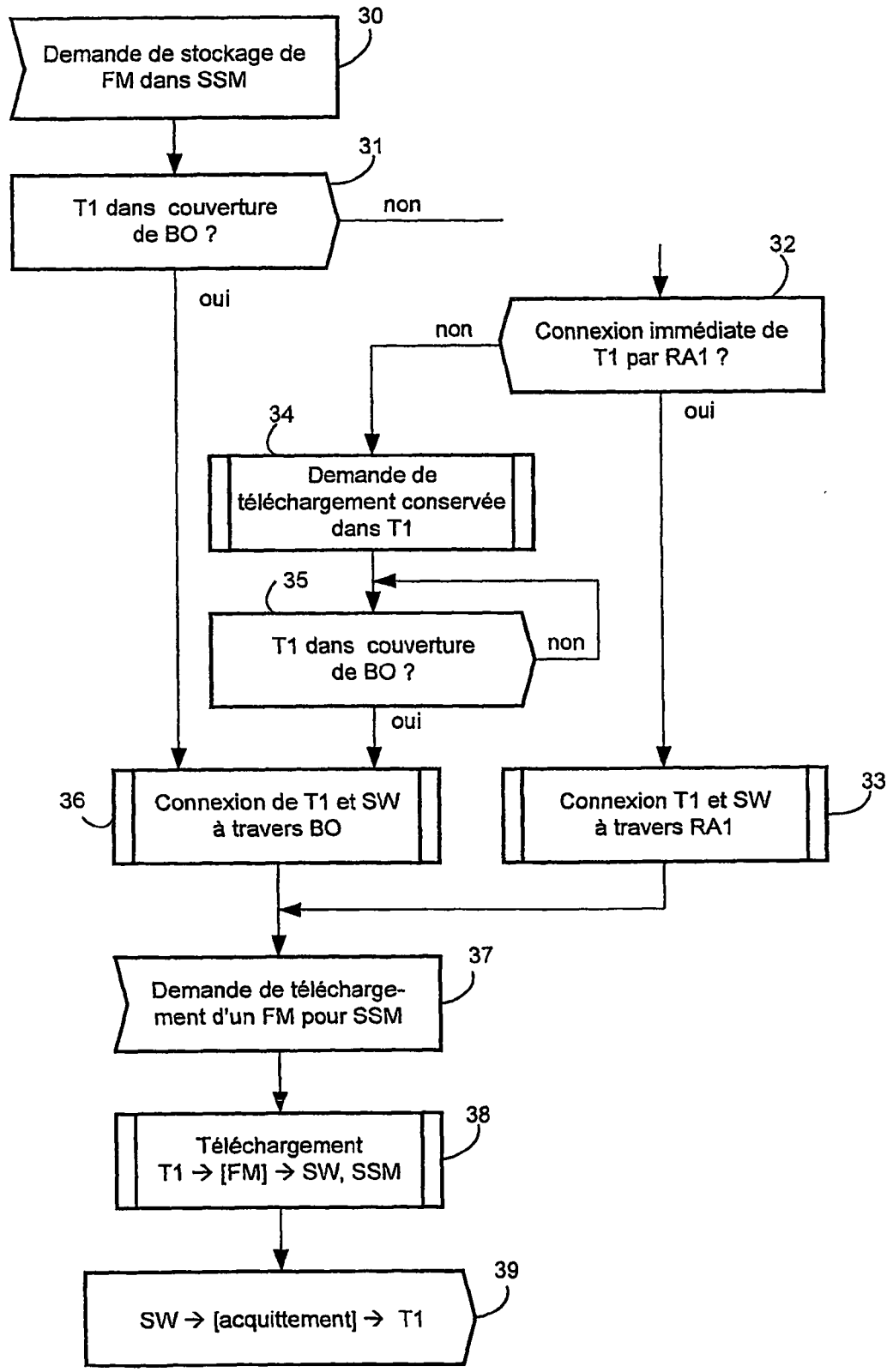
FIG. 4 is a multimedia file storage method algorithm of the invention.

As shown in FIG. 4, the storage of a multimedia file FM in the storage zone ZPR or ZPU assigned to the user of the terminal T1 in the storage server SSM comprises steps 30 to 39.

A request to store a multimedia file in the server SSM is triggered, in the step E30, by pressing a predetermined key on the terminal T1 or the validation of a menu on the screen of the terminal T1. In the next step 31, analogous to the step 21, the terminal T1 decides to set up a connection with the server SW via the station BO and the access network RAF or via the radiotelephone network RA1 after validation of the user of the terminal T1.

If the terminal T1 is not detected by the station BO, a choice is offered on the screen of the terminal T1 between immediate downloading of the multimedia file to the radiotelephone network RA1 and deferred downloading, in the step 32. If the user decides on immediate connection of the terminal T1 to the network RA1, the terminal T1 is connected to the server SW through the network RA1 in the step 33. If the user refuses the immediate connection, the terminal T1 retains the downloading request and the characteristics of the multimedia file to be downloaded specified in the step 30 in memory during an intermediate step 34 until the station BO detects in its coverage area the terminal T1 in the step 35.

As soon as the terminal T1 and the station BO have detected each other in the step 31 or 35, the station BO connects the terminal T1 through the access network RAF to the web server SW in the step 36.

Then, in the step 37 following the connection step 33 or 36, a request to download a multimedia file FM for the storage zone ZPU or ZPR through the web server SW is authorized only if the server SW has recognized the address AT1 of the terminal T1 supplied by the network RA1 or RP. In the next step 38 the terminal T1 transmits the multimedia file FM through the network RA1, or the station BO and the network RAF, to the web server SW, which directs it to the server SSM and more precisely to the storage zone ZPU or ZPR assigned to the user of the terminal T1 and selected in the step 30. The server SW then acknowledges the downloading of the multimedia file FM to the terminal T1 in the step 39.

The invention is not limited to the embodiment described with reference to FIGS. 1 to 4.

The notification server SN is not limited to a short message server and, in another embodiment, may be replaced by a gateway GPRS support node (GGSN) and a serving GPRS support node (SGSN) interconnected by a general packet radio service (GPRS) packet network that is connected to the home location register as well as to a plurality of base station controllers of the radiotelephone network RA1. The gateway node GGSN is connected to the message sorting center CTM by a dedicated connection and to the web server SW through the Internet RP.

According to other examples, the mobile terminal T1 may be a personal mobile telecommunication tool or device such as a personal digital assistant (PDA) or a portable microcomputer equipped with a cellular radiotelephone send-receive module.

The invention claimed is:

1. A system for access to a multimedia file through a telecommunication network from a mobile terminal for which is intended a message including an address of said mobile terminal and said multimedia file transmitted by a second terminal, said telecommunication network designating said mobile terminal by said address, and said system including a server for detecting a multimedia file in a message transmitted by said second terminal in order to extract therefrom said address of said mobile terminal and the detected multimedia file, to store said multimedia file extracted from said message in a storage space, and notification means for transmitting a multimedia file storage notification to said mobile terminal identified by said address extracted from said message, said storage space being assignable to a user of said mobile terminal and being accessible to said mobile terminal through said server in order for said multimedia file extracted from said message to be stored in said storage space in corresponding relationship with said address of said mobile terminal extracted from said message, and said mobile terminal being arranged for accessing the stored multimedia file only if said server has recognized said address of said mobile terminal supplied by said telecommunication network after the setting up of a connection between said mobile terminal and said server through said telecommunication network.

2. A system according to claim 1, wherein said storage space is divided into a private zone for storing multimedia files accessible only to said user of said mobile terminal and a public zone for storing multimedia files accessible to a user of second terminal.

3. A system according to claim 2, wherein the storage space can be controlled so the detected multimedia file extracted from said message can be transferred from said public zone to said private zone.

4. A system according to claim 1, wherein said server is arranged for validating a password transmitted by said second terminal before the transmission of said message by said second terminal before detecting a multimedia file in said message.

5. A method of gaining access to a multimedia file through a telecommunication network from a mobile terminal for which is intended a message including an address of said mobile terminal and said multimedia file transmitted by a second terminal, said telecommunication network designating said mobile terminal by said address, and said method including through said telecommunication network the steps of:

detecting a multimedia file in a message transmitted by said second terminal and extracting therefrom said address of said mobile terminal and the detected multimedia file, storing said multimedia tile extracted from said message, notifying multimedia file storage by a notification transmitted to said mobile terminal identified by said address extracted from said message, and assigning a storage space accessible to said mobile terminal through said telecommunication network so (a) said multimedia file extracted from said message is stored therein in corresponding relationship with said address of said mobile terminal extracted from said message, and (b) said mobile terminal accesses the stored multimedia file only if said address of said mobile terminal supplied by said telecommunication network after the setting up of a connection with said mobile terminal is recognized through said telecommunication network.

6. A method according to claim 5, including an evaluation of the size of said multimedia file detected in said message in order for said notification to be sent, said multimedia file being included in said notification if said size of said multimedia file is less than a minimum size.

7. A method according to claim 5, including gaining access to said multimedia file by means of said mobile terminal, said multimedia file being stored in corresponding relationship with the extracted address in said storage space assigned to said mobile terminal, via a server through a radiotelephone network to which said mobile terminal belongs if said mobile terminal is not detected by a station having a short-range connection with said mobile terminal, and through said station if said mobile terminal is detected by said station.

8. A method according to claim 5, including gaining access to said multimedia file by said mobile terminal, said multimedia file being stored in corresponding relationship with the extracted address in said storage space assigned to said mobile terminal, via a server through a radiotelephone network to which said mobile terminal belongs if said mobile terminal is not detected by a station having a short-range connection with said mobile terminal and a user of said mobile terminal decides on an immediate connection of said mobile terminal to said radiotelephone network, and through said station if said mobile terminal is detected by said station, including when said user refuses said immediate connection.

9. A method according to claim 5, wherein a user accesses said storage space that is assigned to him to consult and delete multimedia files in said storage space from any terminal including said mobile terminal.

10. A method according to claim 7, wherein, if said message includes a text block, said notification further includes said text block.

11. A server for access to a multimedia file through a telecommunication network from a mobile terminal for which is intended a message including an address of said mobile terminal and said multimedia file transmitted by a second terminal, said telecommunication network designating said mobile terminal by said address, and said server being adapted (a) to detect a multimedia file in a message transmitted by said second terminal in order to extract therefrom said address of said mobile terminal, and the detected multimedia file, and (b) to store said multimedia file extracted from said message in a storage space, said server being adapted to notify multimedia file storage by a notification to said mobile terminal identified by said address, said storage space that is assigned to a user of said mobile terminal and that is accessible to said mobile terminal through said server in order for said multimedia file extracted from said message to be stored therein in corresponding relationship with said address of said mobile terminal extracted from said message, said mobile terminal being arranged for accessing said stored multimedia file only if said sewer has recognized said address of said mobile terminal supplied by said telecommunication network after the setting up of a connection between said mobile terminal and said server through said telecommunication network.

12. A server according to claim 11, wherein said storage space is divided into a private zone for storing multimedia files accessible only to said user of said mobile terminal and a public zone for storing multimedia files accessible to a user of second terminal.

13. A server according to claim 11, further including processor means for evaluating the size of said multimedia file detected in said message in order for said notification to be sent, said multimedia file being included therein if said size thereof is less than a minimum size.

14. A computer readable tangible medium having computer readable indicia or storage device having computer readable indicia, the indicia including a computer program adapted to be implemented in a storage server adapted to store multimedia files accessible through a telecommunication network from a mobile terminal far which is intended a message including an address of said mobile terminal and said multimedia file transmitted by a second terminal, said telecommunication network designating said mobile terminal by said address, and said program including program instructions which, when said program is executed in said server, carry out the following steps:

detecting a multimedia file in a message transmitted by said second terminal so there is extracted therefrom said address of said mobile terminal and the detected multimedia file, storing said multimedia file extracted from said message, notifying multimedia file storage by a notification transmitted to said mobile terminal identified by said address, and gaining access said stored multimedia file only if said server has recognized said address of said mobile terminal supplied by said telecommunication network after setting up a connection between said mobile terminal and said server through said telecommunication network.

15. A method according to claim 6, including gaining access to said multimedia file by said mobile terminal, said multimedia file being stored in corresponding relationship with the extracted address in said storage space assigned to said mobile terminal, via a server through a radiotelephone network to which said mobile terminal belongs if said mobile terminal is not detected by a station having a short-range connection with said mobile terminal, and through said station if said mobile terminal is detected by said station.

16. A method according to claim 6, including gaining access to said multimedia file by said mobile terminal, said multimedia file being stored in corresponding relationship with the extracted address in said storage space assigned to said mobile terminal, via a server through a radiotelephone network to which said mobile terminal belongs if said mobile terminal is not detected by a station having a short-range connection with said mobile terminal and a user of said mobile terminal decides on an immediate connection of said mobile terminal to said radiotelephone network, and through said station if said mobile terminal is detected by said station, including when said user refuses said immediate connection.

17. A method according to claim 7, including gaining access to said multimedia file by said mobile terminal, said multimedia file being stored in corresponding relationship with the extracted address in said storage space assigned to said mobile terminal, via a server through a radiotelephone network to which said mobile terminal belongs if said mobile terminal is not detected by a station having a short-range connection with said mobile terminal and a user of said mobile terminal decides on immediate connection of said mobile terminal to said radiotelephone network, and through said station if said mobile terminal is detected by said station, including when said user refuses said immediate connection.

18. A server according to claim 12, further including processor means for evaluating the size of said multimedia file detected in said message in order for said notification to be sent, said multimedia file being included therein if said size thereof is less than a minimum size.

* * * * *